March 26, 1935.  G. H. B. DAVIS  1,995,604
PROCESS FOR PRODUCING HIGH GRADE MOTOR FUEL BY DESTRUCTIVE
HYDROGENATION IN A SERIES OF CONVERSION STAGES
Filed Aug. 4, 1930
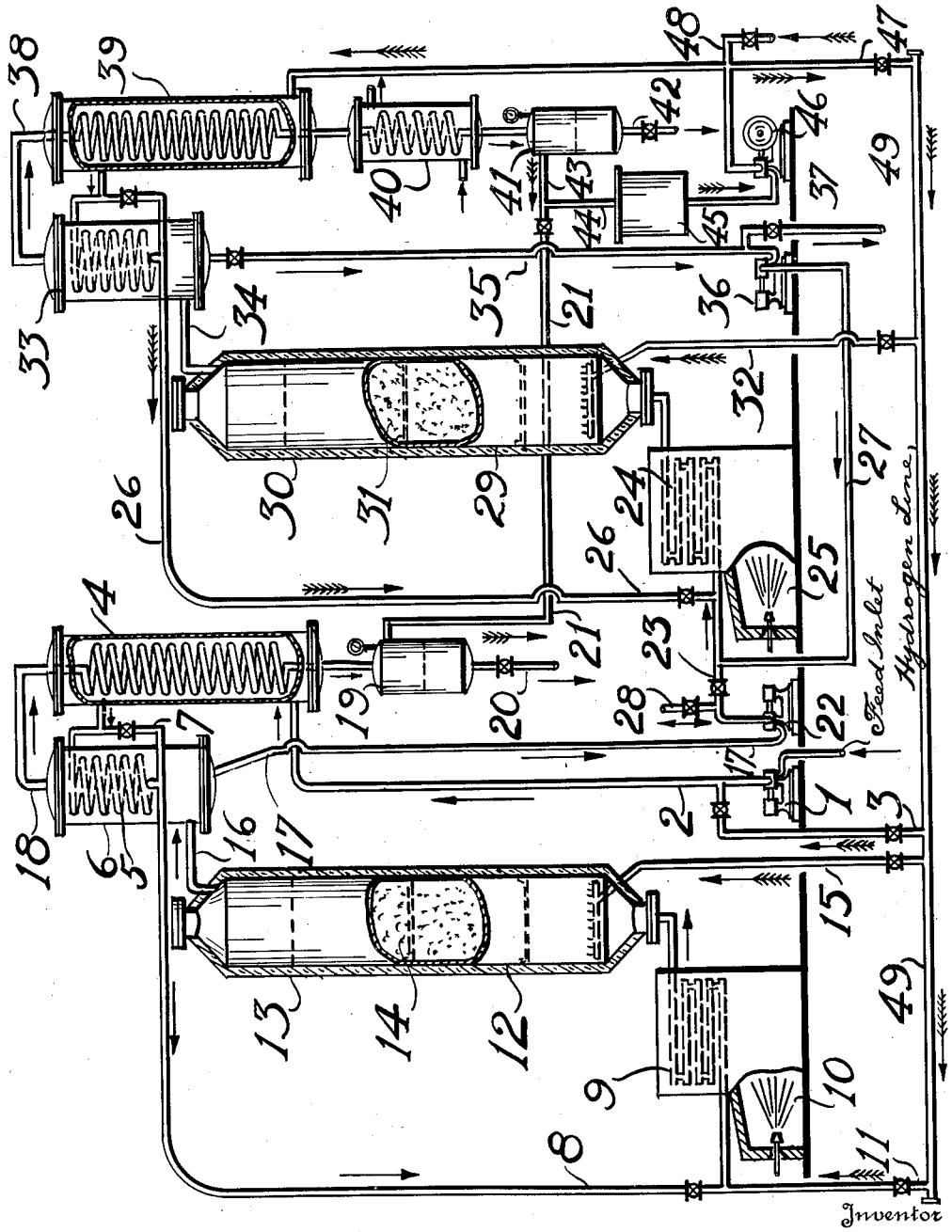
Inventor
Garland H. B. Davis
By
W. E. Currie, Attorney Patented Mar. 26, 1935

1,995,604

UNITED STATES PATENT OFFICE 1,995,604

PROCESS FOR PRODUCING HIGH GRADE MOTOR FUEL BY DESTRUCTIVE HYDROGENATION IN A SERIES OF CONVERSION STAGES

Garland H. B. Davis, Baton Rouge, La., assignor to Standard-I. G. Company

Application August 4, 1930, Serial No. 472,884

3 Claims. (Cl. 196—53)

The present invention refers to an improved process for the production of low boiling oils from higher boiling hydrocarbon oils by reaction with hydrogen under elevated temperatures. The invention applies specifically to an improved method of operation whereby the hydrocarbon oil is transformed into high grade anti-detonating motor fuel in two or more conversion stages. My invention will be fully understood from the following description and drawing which illustrates one form of apparatus suitable for carrying out my process.

The drawing shows diagrammatically in sectional elevation an apparatus constructed according to my process and indicates the flow of the various materials in the process.

Referring to the drawing the hydrocarbon oil is fed by pump 1 from any suitable source into line 2 where it may mix with a supply of gas rich in hydrogen from line 3. From 2 the material flows into heat exchanger 4 and thence through the coils 5 of partial condenser 6. Coil 5 is provided with a by pass line 7 for controlling the temperature within the partial condenser. From 5 the material flows by means of line 8 to heating coil 9 mounted in suitable furnace setting 10. Additional hydrogen may be added at the coil inlet by means of pipe 11. Coil 9 discharges into reaction drum 12 which is adapted to withstand temperatures in excess of 900° F. and pressures of several hundred atmospheres. The drum is covered by suitable insulation 13 and is preferably packed with a catalytic material 14 which may be placed in the drum in lump form or spread upon other suitable surfaces. Hydrogen or gas rich in hydrogen may be added to drum 12 by means of line 15.

Gas and oil pass from drum 12 to partial condenser 6 by means of line 16. The temperature in 6 is controlled so as to condense fractions of a boiling point too high for motor fuels which condensate passes from the partial condenser by line 17. Uncondensed motor fuel and gas escape from partial condenser 6 by line 18 to heat exchanger 4 and separator 19. Condensed anti-knock motor fuel may be withdrawn from drum 19 by means of draw-off line 20, while the gas is removed through pipe 21. It will be understood that I may use other equivalent means in place of partial condenser 6, for example a bubble plate tower, or raschig ring tower may be employed.

The oil in line 17 is forced by pump 22 and line 23 into heating coil 24 which is mounted in furnace 25. Hydrogen may be supplied in a heated condition at the coil inlet by means of line 26 and/or cold hydrogen may be furnished from line 49 by any suitable connection (not shown). If desired, a portion of the oil in line 17 may be withdrawn from the process through line 28, or suitable oil from an external source may be introduced to the stream in line 17 by this means. Heating coil 24 discharges into reaction drum 29 which is provided with suitable insulation 30, and which is constructed to withstand conditions similar to those stated for drum 12.

The interior of the drum is filled with catalytic material 31 whch may, or may not be of the same composition as catalyst 14 in drum 12. Additional hydrogen may be supplied to drum 29 by pipe 32. The mixture of hot gas and oil passes from drum 29 to partial condenser 33 by means of line 34. The temperature in 33 is controlled so as to condense fractions of a boiling point too high for motor fuels. These fractions are removed through line 35 to pass to pump 36 which recycles them back to coil 24 and drum 29 for retreatment. If desired, all or part of this oil may be removed from the process by means of connection 37. For example, the oil in 35 may be conducted by 37 to a third heating coil and reaction chamber for conversion into motor fuel. It will be understood that I may employ more than three reactors, if desired, each reactor being connected to receive the unconverted oil from the previous reactor whereby the last reactor serves to complete the conversion to motor fuel.

Gas and uncondensed motor fuel pass from the top of partial condenser 33 by line 38 to heat exchanger 39 and thence through auxiliary cooler 40. Motor fuel which is condensed in 39 and 40 is separated from the gas in separator 41 and may be withdrawn from the process by line 42. The gas from 41 flows by line 43 into line 44 where it joins the gas from separator 19. The gas in line 44 passes to purification means 45, where it is subjected to any means suitable for removing gaseous hydrocarbons and hydrogen sulfide. For example, the gas may be scrubbed with heavy oils or with soda ash solution. Purified gas flows to booster compressor 46 which discharges it into line 47. Fresh or make-up hydrogen may be added under pressure to the gas in line 47 by means of connection 48. Gas in line 47 may be sent through heat exchanger 39 and partial condenser 33 for preheating prior to introduction in coil 24 by means of line 26. Line 47 also may conduct gas to manifold 49 for introduction at other points in the process.

In the operation of my process the feed stock consists of hydrocarbon oil distillates such as gas oil, heavy naphtha and the like. When these oils are treated at high temperature in the presence of hydrogen to produce anti-knock gasoline, only a portion, say 20 to 70% of the feed stock is converted to motor fuel on one passage through the reaction drum. It is, therefore, desirable to separate the heavier unconverted fractions from the gasoline and recycle them through the reactor for transformation into the desired product. It has been found that the character of this recycle oil is widely different from that of the feed oil, being much more aromatic than the feed and increasingly so as the process is operated under conditions to produce a more anti-knock motor fuel. For example, the aniline miscibility point of the feed may be above 150° F. while the recycle oil shows an aniline point below 60° F. It has also been found that feed stocks having lower aniline points produce better yields of more highly anti-detonating gasoline. As an illustration, a feed stock having an aniline miscibility point of 124° F. will produce about 75% of a motor fuel equivalent in anti-knock value to a gasoline from a sweet crude blended with 50% benzol, while a feed stock having an aniline point of 164° F. will produce only 60% of a motor fuel of the same quality. Furthermore, in order to produce equivalent gasolines, the high aniline point feed stock must be treated at higher temperatures under a greater partial pressure of hydrogen. For example, 164° F. aniline point stock requires a temperature of about 1000° F. while the 124° F. aniline point stock requires a temperature of only 950° F. in the illustration given above. This corresponds to a reduction of about 1¼° F. per degree reduction in aniline point. In view of these facts, therefore, it appears that it would be desirable to treat the feed oil and the recycle oil under separate conditions, each suited to the character of the oil.

According to my invention, therefore, I propose to treat the feed oil and the recycle oil in separate reaction drums under different conditions of temperature and hydrogen partial pressure. Different catalysts and pressures may be employed if desired. It will be understood that I may employ more than two reaction stages of treatment, in which case the fractions too heavy for motor fuel from each stage will be used as the feed for the subsequent reaction stage. In my description, however, for purposes of simplification I use but two reactors to illustrate my process. The first stage, in which the feed stock is treated in one passage through the reactor to produce anti-knock gasoline and a lower aniline point recycle oil, will be referred to as the primary hydrogenation stage, while that stage in which the heavy fractions from the first stage are subjected to further treatment to convert them totally to anti-knock gasoline will be known as the secondary hydrogenation stage.

In carrying out my process, the feed oil is heated preferably with hydrogen to a temperature between about 850° F. and 930° F. by rapid passage through a heating coil. The heated mixture then passes under high pressure to the reaction drum of the primary stage. The drum is packed with a suitable catalyst which may comprise oxides and/or sulfides of elements of the sixth group of the periodic system, their mixtures with each other or with other compounds such as zinc oxide, magnesia, lime, or alumina, these being sulfactive, that is characterized by resistance to sulfur.

The primary reaction drum is preferably maintained at a temperature above 930° F. and preferably in a range between 930 and 1050° F., the heat supplied to the reactants in the coil and the heat of reaction in the drum being sufficient to maintain the temperature therein. The pressure is held above about 20 atmospheres, preferably in the range between about 100 and 200 atmospheres. An excess of hydrogen or hydrogen containing gas is passed through the reactor with the oil, but only in sufficient excess to prevent the formation of carbon or tarry materials. In general, it is preferable to employ hydrogen in the ratio of about 1000 to 4000 cubic feet per barrel of oil fed to the primary reactor. The oil feed rate to the primary stage is preferably between 1.0 and 3.5 volumes of oil per volume of reaction drum per hour.

The hydrogen and oil in flowing through the catalytic mass react to from anti-knock gasoline to a volume equivalent to about 20 to 70% of the feed. As mentioned above, these fractions together with the heavier unconverted oil and gas pass from the drum into a separation means where the heavy fractions are removed. The separation may be carried out by any suitable means such as partial condensers, bubble towers or the like. The light fractions comprising an anti-knock motor fuel boiling below about 400° F. or 430° F. pass from the separation means along with the gas to a suitable cooling means where they are condensed and separated from the gas.

The heavier fractions are passed to a heating coil where they are heated to a temperature between about 850° F. and 930° F. The heating coil discharges into the secondary reactor which is packed with a suitable catalyst which may or may not be of the same composition as that in the primary reactor. In general, however, the catalyst may preferably comprise materials as mentioned in connection with the catalyst for the primary reactor.

Hydrogen gas may pass through the coil with the oil or may be introduced separately into the secondary reactor in a heated or unheated condition. The hydrogen may consist of that employed in the primary stage, or fresh hydrogen, or both may be used. As in the primary stage only sufficient hydrogen is used in the secondary reactor to prevent the formation of coke or asphaltic materials. Ordinarily the excess of hydrogen required in the secondary reactor is about 500 to 2,000 cubic feet per barrel of oil less than that necessary in the first stage. In general, it is preferable to employ hydrogen in an amount equivalent to about 1000 to 3000 cubic feet per barrel of oil fed to the secondary reactor, or less may be employed. The pressure may be the same as that in the primary reactor, or may be higher, or lower. It is ordinarily in excess of 20 atmospheres and preferably above about 100 to 200 atmospheres.

The secondary reactor is carried at a temperature above 900° F. and may be maintained at the same temperature or about 20 to 75° F. higher or lower than the primary reaction drum as will be explained. In general, however, the temperature may be set between about 930 and 1000° F. The feed rate to the secondary reactor is dependent on the degree of improvement desired in the product and is lower for greater improvement, as will be understood. In general, the feed rate may be taken between about 1.5 and 4.0 volumes of oil per volume of reactor per hour.

If more than two reaction stages are used, the difference in operating conditions between the respective reactors is preferably less than with two reactors. In general, the difference in conditions between the first and last reactor of such a series may ordinarily be adjusted to a magnitude equivalent to the difference between the two reactors in the two stage operation as described. As will be understood, it is desirable to operate with as many reaction stages in series as possible, since the heavy fractions from the successive stages become progressively more aromatic and may advantageously be treated in separate reactors under the most suitable conditions for high yield of anti-knock gasoline. Ordinarily, however, the number of reactors employed is limited by economic considerations so that practically, three, or even two reactors may be used. The last reaction stage in the series is preferably supplied with a means for separating and recycling fractions in the product which are too heavy for motor fuel. This recycle fraction may be returned to any reaction stage of the series or may be divided and sent to all stages. It will be understood that I may also employ two or more reactors in parallel connection as one reaction stage in my process. For example, if recycling is used in the last stage, it may be necessary to employ two or more reactors and their adjuncts in parallel in order to obtain sufficient capacity.

As indicated above, it is desirable to decrease the ratio of hydrogen to oil in the successive reaction stages. This is preferably reduced roughly in proportion to the change in aniline miscibility point of the feed from stage to stage. For example, when operating at about 960° F. and throughputs of 2.0 volumes of oil per volume of reactor per hour with catalysts as described above, the following relations between aniline point of feed oil and ratio of hydrogen to oil have been found satisfactory:

| Aniline point | Cu. ft. of hydrogen per bbl. of oil |
|---|---|
| 168° F. | 1800 |
| 120° F. | 1500 |
| 80° F. | 1200 |

It will be observed in this case that the quantity of hydrogen used in the successive stages may be decreased by about 300 cu. ft. per barrel of oil for a drop in aniline point of about 40° F. Under these conditions an anti-knock gasoline of about the same quality was produced in each case. If operation is conducted with successively increasing temperatures from reaction stage to reaction stage, it may be desirable to increase the ratio of hydrogen to oil in the successive reaction zones. The extent which this ratio is increased depends largely on the temperatures employed, but may be, in general, in an amount sufficient to prevent formation of tarry or asphaltic materials.

In carrying out my process, I contemplate three modes of operation as regards conditions of temperature. In the first type of operation, the temperature is lowered from stage to stage, so that the last reactor in the series is maintained at a temperature about 20 to 75° F. lower than that of the first reactor. The temperature is preferably reduced from stage to stage roughly in proportion to the decrease in aniline miscibility point of the oil fed to the respective reactors. In this way, if desired, gasoline of the same anti-knock quality may be produced in each reaction stage. By operating in this manner it is possible to produce a maximum yield of gasoline of excellent commercial anti-knock quality. For example the fuel obtained in this way may be equal in anti-detonating characteristics to a gasoline from a sweet crude to which about 40 percent of benzol has been added.

In the second mode of operation the same temperature is maintained in all the reaction stages. Other conditions, such as pressure, throughput, and proportion of hydrogen and oil, may be different in each reactor, as previously pointed out. When operation is carried out in this manner, the anti-knock quality of the motor fuel obtained is somewhat better than when decreasing temperatures are employed in the successive stages, but the yield is less.

As a third method, I may increase the temperatures in the successive reaction stages. By this means the motor fuel obtained will possess extremely high knock-suppressing characteristics, but the yield will be substantially below that secured by the previous two schemes of temperature regulation. The fuel is ordinarily superior in knock-suppressing value to a gasoline from an ordinary sweet crude to which 50 or 60 percent of benzol has been added. For this reason the fuel may preferably be employed as a blending stock with motor fuel of less desirable anti-knocking characteristics, although it may be used as a motor fuel directly, if desired.

In general I prefer to blend the motor fuel obtained from the different reaction stages of my process, although if desired I may separately employ the oil from one or more stages. For example, if the fuel produced by the first reaction stage is not sufficiently knock suppressing, it may be segregated and not blended with the fuel from the remaining stages.

Under certain conditions I find it desirable to introduce oil from an external source into any or all of the oil streams flowing between the reaction stages. For example, where the hydrogen gas is passed from stage to stage it may be necessary to add additional oil between the stages in order to maintain the proper ratio of oil to gas in the several reaction stages. If the oil added in this manner tends to raise the aniline points of the heavy fractions to which it is added, it may be desirable to operate with higher temperatures in the subsequent reaction stages than in the first stages.

The motor fuel which is obtained from my process is not only markedly superior as regards anti-detonation characteristics, but is also low in sulfur, usually containing less than 0.05 percent. The fuel furthermore possesses a very low content of resinous or gum forming materials.

My invention is not to be limited by any theory of the mechanism of the reactions nor to any specific example which may have been given for purpose of illustration, but only by the following claims in which I wish to claim all novelty inherent in my invention.

I claim:

1. In a destructive hydrogenation process for preparing motor fuel of high anti-detonation value from higher boiling hydrocarbon oil which comprises subjecting the higher boiling hydrocarbon oil in the presence of a hydrogenating sulfactive catalyst selected from the class comprising oxides and sulfides of metals of the VI Group of the periodic system in a series of stages in vapor phase to the action of hydrogen at a temperature in each stage of at least 900° F. for a time sufficient to cause the formation of gasoline fractions, maintaining in each stage a total pressure in excess of 20 atmospheres and a partial pressure of hydrogen high enough to inhibit coke formation and polymerization, but not high enough to cause substantial saturation of the hydrocarbons, maintaining substantially the same space velocity in each stage and removing motor fuel fractions between each stage, the method of obtaining motor fuel fractions of substantially the same anti-detonation value from each stage which comprises providing each stage with a catalyst of substantially the same activity for promoting hydrogenation, reducing the temperature from stage to stage by an amount corresponding to 1.25 degrees per degree reduction desired in the aniline point, and reducing the partial pressure of hydrogen from stage to stage by an amount corresponding to a reduction of 300 cubic feet of hydrogen per barrel of oil for a decrease of about 40° F. in the aniline point of the product.

2. In a destructive hydrogenation process for preparing motor fuel of high anti-detonation value from higher boiling hydrocarbon oil which comprises subjecting such higher boiling hydrocarbon oil in the presence of a hydrogenating sulfactive catalyst selected from the class comprising oxides and sulfides of metals of the VI Group of the periodic system to treatment in a series of stages in vapor phase with hydrogen at a temperature in each stage of at least 900 F. for a time sufficient to cause formation of gasoline fractions, maintaining in each stage a total pressure in excess of 20 atmospheres and a partial pressure of hydrogen high enough to inhibit coke formation and polymerization but not high enough to cause substantial saturation of the hydrocarbons, maintaining substantially the same space velocity in each stage, and removing motor fuel fractions between each stage, the method of obtaining motor fuel fractions of increasingly high anti-detonation value from each succeeding stage which comprises providing each stage with a catalyst of substantially the same activity for promoting hydrogenation, operating each stage at substantially the same temperature but reducing the partial pressure of hydrogen from stage to stage by an amount corresponding to a decrease of 300 cu. ft. of hydrogen per barrel of oil for a decrease of about 40° F. in the aniline point of the product.

3. Process according to claim 2, in which fresh oil is introduced into the system between two or more of the successive stages.

GARLAND H. B. DAVIS.